United States Patent [19]

Henderson et al.

[11] Patent Number: 5,264,826
[45] Date of Patent: Nov. 23, 1993

[54] MOTORCYCLE SIGNALLER

[76] Inventors: Steven Henderson, 5508 Casgrain, Montreal, Quebec, Canada, H2T 1X2; David Kernaghan, 2360 Beaconsfield, Montreal, Quebec, Canada

[21] Appl. No.: 863,686
[22] Filed: Apr. 1, 1992
[51] Int. Cl.$^5$ .............................. B60Q 1/52
[52] U.S. Cl. ...................... 340/471; 340/475; 340/469; 340/427; 340/432; 340/331; 340/332; 340/326; 315/200 A
[58] Field of Search ............. 340/471, 474, 475, 469, 340/427, 432, 332, 331, 326; 315/200 A

[56] References Cited

U.S. PATENT DOCUMENTS

| | | | |
|---|---|---|---|
| 2,931,028 | 3/1960 | Propst | 340/432 |
| 3,148,306 | 9/1964 | Onksen et al. | 315/82 |
| 3,407,385 | 10/1968 | Gopalan et al. | 340/81 |
| 3,548,251 | 12/1970 | Carbary | 315/77 |
| 3,821,702 | 5/1974 | Mogi | 340/81 |
| 3,916,377 | 10/1975 | Demeter | 340/65 |
| 3,989,980 | 11/1976 | Berman | 315/154 |
| 4,051,361 | 9/1977 | Lichon et al. | 362/211 |
| 4,127,844 | 11/1978 | Purdy | 340/66 |
| 4,241,328 | 12/1980 | Lobe et al. | 340/75 |
| 4,550,305 | 10/1985 | Bookbinder | 340/134 |
| 4,656,564 | 4/1987 | Felder | 340/432 |
| 4,760,372 | 7/1988 | Watson | 340/432 |
| 4,779,169 | 10/1988 | Cruze | 340/432 |
| 4,812,808 | 3/1989 | Ulrich | 340/468 |

OTHER PUBLICATIONS

*Psychological Review*, 1939, vol. 46, pp. 337-358, "Some Factors in Brightness Discrimination", S. Howard Bartley, Washington University.
In Stevens, S. S., (ed.). *Handbook of Experimental Psychology*, 1951, New York, Wiley. p. 974.
Vision Res., vol. 30, No. 3, pp. 381-386, 1990, Printed in Great Britain, "Adaptation to Peripheral Flicker: Relationship to Contrast Detection Thresholds", Harris et al.
Brain (1989), 112, pp. 871-894, "Spatial and Temporal Contrast Sensitivity in Hemianopia", R. F. Hess et al.

*Primary Examiner*—John K. Peng
*Assistant Examiner*—Nina Tong

[57] ABSTRACT

An emergency flasher circuit for use with motorcycles and bicycles comprising an emergency switch, a signal generator for generating a signal having a frequency of approximately 10 Hz, and logic circuitry for selectively applying the signal to one or both of the left and right turn indicator lights and a headlight of a motorcycle or bicycle, for alerting drivers of motor vehicles to the presence of the motorcycle or bicycle.

6 Claims, 4 Drawing Sheets

MOTORCYCLE SIGNALLER

FIELD OF THE INVENTION

This invention relates in general to signalling systems, and more particularly to an emergency flasher circuit for use with motorcycles and bicycles.

BACKGROUND OF THE INVENTION

Each year in North America, many thousands of motorcyclists die in collisions with automobiles and trucks. In many of these accidents, the driver of the automobile or truck claims not to have seen the motorcycle. Because motorcycles subtend a much smaller angle of the visual field than do cars (particularly in front view), a motorcycle whose image falls on the peripheral retina of an automobile or truck driver may not generate sufficient motion induced activity in retinal neurons to render the motorcycle salient to the car or truck driver.

A number of prior art devices are known for heightening the awareness of automobile and truck drivers to the presence of motorcycles. For example, U.S. Pat. No. 4,241,328 (Lobe et al) teaches a circuit arrangement for the turn indicator blinker lights of motorcycles. When the motorcycle is moving (i.e. not in neutral and with the clutch engaged) and one of the turn indicators is activated, a buzzer is activated to provide a combined audible and visual signal. When the clutch is disengaged or the transmission is in neutral, then the buzzer or horn is left inactivated when the turn signal is activated.

U.S. Pat. No. 4,812,808 (Ulrich) discloses a lighting system for motorcycles with minimal wiring cables and harnesses.

U.S. Pat. Nos. 3,916,377 (Demeter) and 4,051,361 (Lichon et al) disclose prior art signal devices for use with motorcycles to identify the presence of a motorcycle. Each of these patents discloses a flasher mounted to the top of a mast at the rear of the motorcycle. The '361 Patent specifies that left and right turn indication is possible.

U.S. Pat. No. 4,127,844 (Purdy) discloses a high intensity electronic flasher warning system which operates in the range of 60 to 100 flashes per minute (i.e. 1 to ⅔ Hz). The flasher is activated by either the brake, turn or emergency flash circuits of the motorcycle.

U.S. Pat. No. 4,550,305 (Bookbinder) also discloses a pulsating lighting system for motorcycles in which a first strobe is associated with the headlamp and a second strobe is associated with operation of the tail light. The strobes are indicated as operating in the range of 1 to 2 Hz.

Another prior art visual warning system is available for bicycles and is manufactured under the trade name "Vistalite" by Vistalite Inc. of Lancaster, Pa., U.S.A. The "Vistalite" system generates a flicker frequency between 4 Hz and 6 Hz.

Although the above discussed prior ar warning systems are known to improve driver awareness to the presence of motorcycles and bicycles, none of the prior art systems maximize the visual salience of images falling on the retinal periphery (i.e. so as to call the driver's attention to objects and hazards that are not being directly looked at).

SUMMARY OF THE INVENTION

Vision researchers have found that the human eye is maximally sensitive to light modulated at 10 Hz. For example, Bartley (1939, 1951) shows that the brightness enhancement effect is maximal at a flash frequency of approximately 10 Hz, which is the alpha rhythm of the occipital cortex (the principal visual processing region of the brain). Bartley further reports that maximum brightness enhancement occurs when the light-to-dark ratio is 1:1 (i.e. a 50% duty cycle). Furthermore, Harris, Calbert, and Snelgar (1990), and Hess and Pointer (1989), show that 10 Hz is in fact the flicker frequency at which temporal contrast sensitivity is maximized. (Contrast sensitivity is a measure of maximum detection distance, as detection distance is directly proportional to the square root of the temporal contrast sensitivity for any flicker frequency.) Harris et al tested temporal contrast sensitivity at 12 degrees of retinal eccentricity, and Hess and Pointer tested at 0, 5, 10, 20, 40, and 60 degrees of retinal eccentricity. Harris et al also found that the number of temporal cycles before flicker adaptation (disappearance) reaches a maximum at 10 Hz.

According to the present invention, an emergency flasher circuit is provided for alerting automobile and truck drivers to the presence of a motorcycle (or bicycle) by flashing the motorcycle (or bicycle) signal lights at a strobe rate of 10 Hz, thereby increasing the visual salience of the motorcycle (or bicycle) image which falls on the retinal periphery of the automobile or truck driver so that visual attention will be drawn to the object at that location. More specifically, a saccade is induced in the driver's eye, causing the location of the flickering light to move to the centre of the retina (i.e. the gaze of the automobile or truck driver is caused to shift to the motorcycle), thereby increasing the driver's awareness of a developing dangerous situation.

According to one embodiment of the invention, the turn indicator lights are caused to flicker at approximately 10 Hz when the horn button is depressed, and when the horn button is depressed simultaneously with one of the turn indicator switches, then the selected turn indicator light is caused to flash in 2 Hz bursts of 10 Hz flicker.

As a modification to the flasher circuit of the present invention, a photocell may be incorporated so that during daylight hours the headlight/taillight may also be caused to flicker upon activating the horn button, and during night-time hours (when the headlight must illuminate the roadway), the turn indicator lights alone flicker.

BRIEF INTRODUCTION TO THE DRAWINGS

A detailed description of the preferred embodiment is provided below in connection with the following drawings, in which.

DETAILED DESCRIPTION OF THE PREFERRED EMBODIMENT

Figure 1:
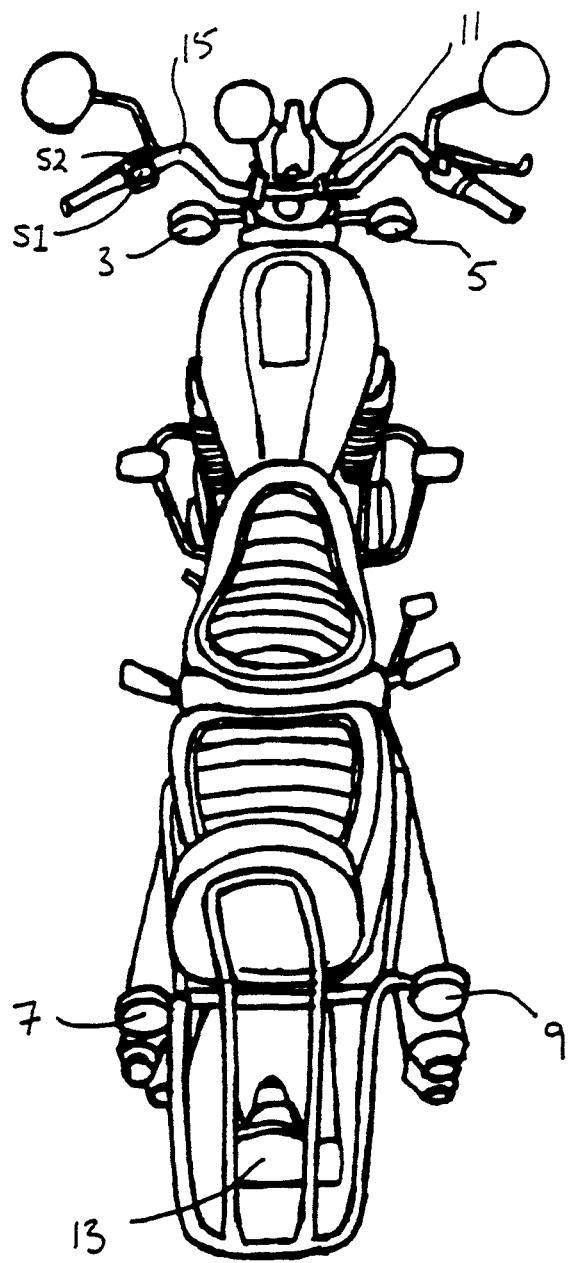
FIG. 1 is a plan view of a motorcycle equipped with headlight and turn indicators.

Turning to FIG. 1, a standard model motorcycle, such as a 1979 Honda CB 750K, is shown comprising front left and right turn indicators 3 and 5, respectively, rear left and right turn indicators 7 and 9, respectively, a headlight 11 and a tail light 13. Located on the handlebar 15 of the motorcycle are a horn activation button S1, and a left or right turn indicator button S2, according to standard design.

Figure 2:
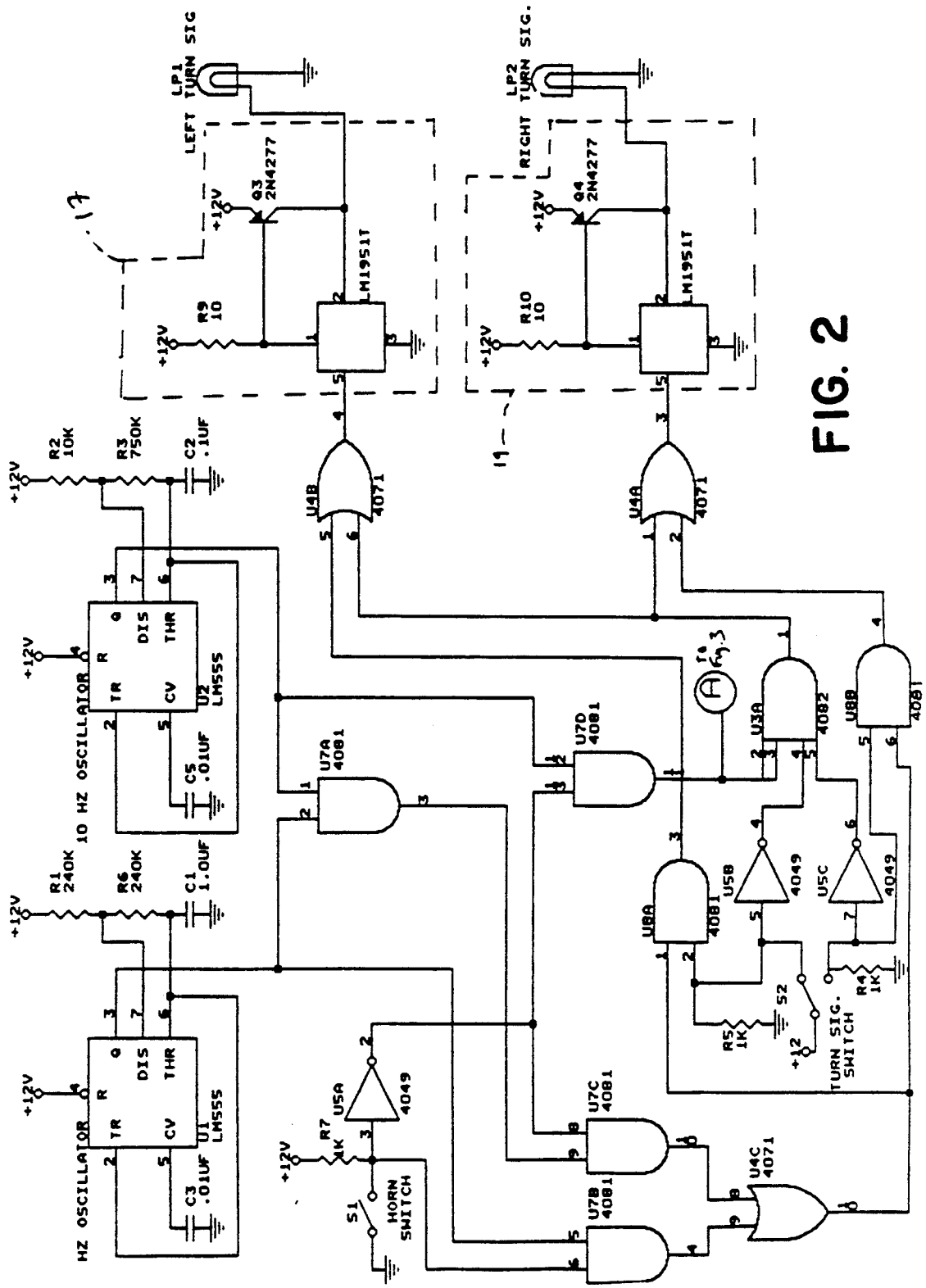
FIG. 2 is a schematic diagram of an emergency flasher circuit in accordance with the preferred embodiment.
Figure 3:
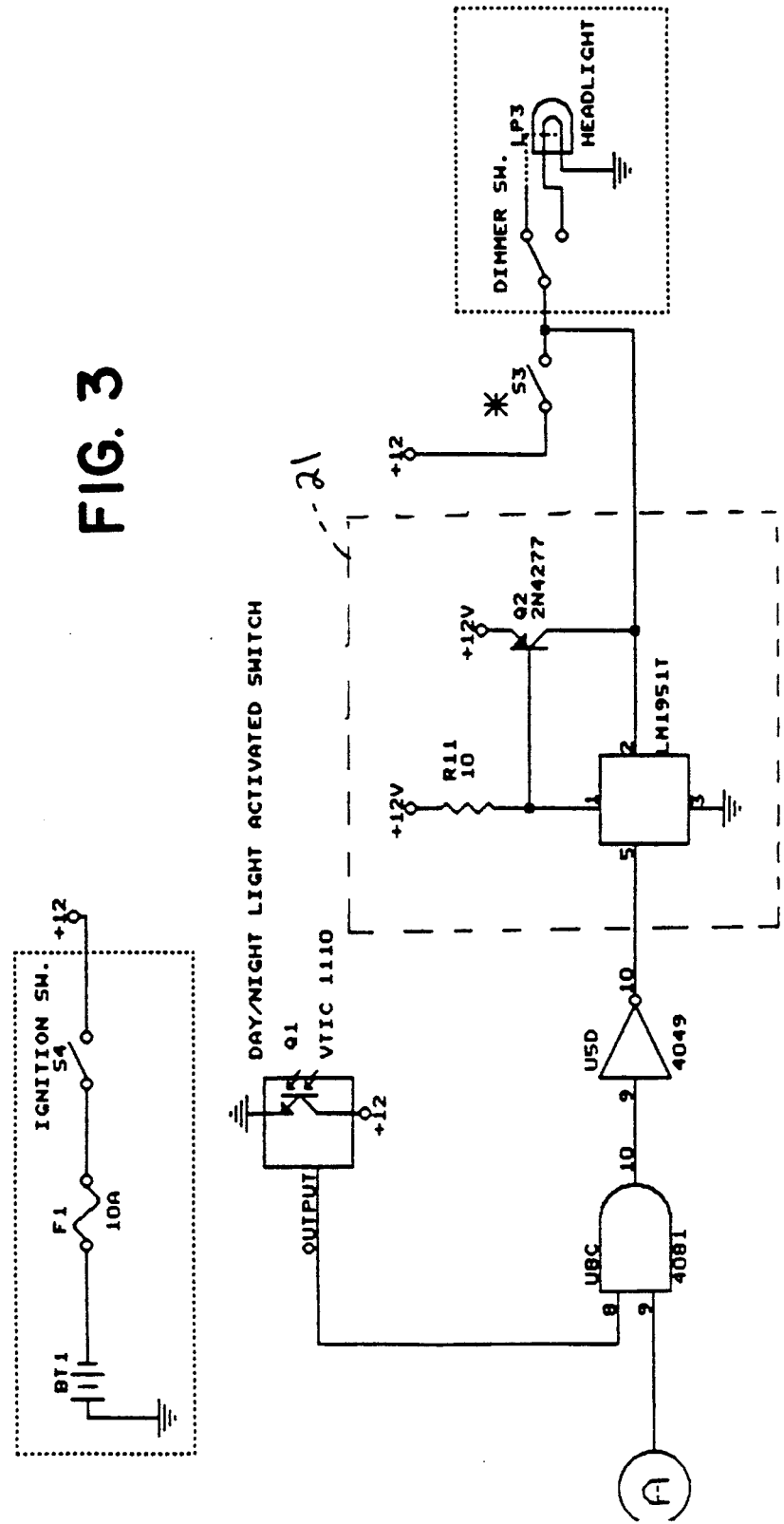
FIG. 3 is a schematic diagram of a photocell enhancement to the emergency flasher circuit of FIG. 2.

With reference to FIG. 2, the motorcycle emergency circuit is shown according to the preferred embodiment comprised in part of a first 2 Hz astable oscillator U1 having an output Q thereof (pin 3) connected to a first input (pin 2) of a first AND gate U7A, and also connected to a first input (pin 5) of a second AND gate U7B. Resistors R1 and R6 and capacitor C1 are connected to control inputs of the precision timer component of oscillator U1 for setting both the frequency and the duty cycle of the logic signal generated at the Q output of oscillator U1 to approximately 2 Hz and 50% respectively. Likewise shown is a second 10 Hz astable oscillator U2, having resistors R2 and R3 and capacitor C2 connected to control inputs of the precision timer component of oscillator U2, and having an output Q thereof (pin 3) connected to a second input (pin 1) of the first AND gate U7A, and also connected to a first input (pin 12) of a third AND gate U7D. Note that the oscillators U1 and U2 supply output signals of 2 Hz and 10 Hz respectively, whenever the ignition switch S4 is closed (FIG. 3). Capacitors C3 and C5 are decoupling capacitors.

The horn activation switch S1 has one pole connected to ground and has the contact portion connected to a pull-up resistor R7 which is connected to a source of +12 volts. The contact portion is also connected to a second input (pin 6) of the second AND gate U7B, and to the input of a first invertor U5A. The output of the first invertor U5A is connected to a first input (pin 8) of a fourth AND gate U7C, and to a second input (pin 13) of the third AND gate U7D. Since the 2 Hz signal from the first oscillator U1 and the 10 Hz signal from the second oscillator U2 are applied to the two inputs to the first AND gate U7A, the output of the first AND gate U7A is a 10 Hz signal in a 2 Hz envelope, this signal being applied to a second input (pin 9) of the fourth AND gate U7C whenever the ignition switch S4 is in the closed position (whenever the motorcycle is in operation).

In normal operation, (i.e. horn activation switch S1 is open), the second input (pin 6) of AND gate U7B receives a logic high voltage signal, and the first input (pin 5) of AND gate U7B receives a 2 Hz logic signal. In that condition, the output of AND gate U7B is a 2 Hz logic signal which is applied to a first input (pin 9) of a first OR gate U4C. Also in that condition, the signal input to the first invertor U5A is a logic high voltage signal. A logic low voltage signal is therefore output from invertor U5A which in turn supplies a logic low voltage signal to the first input (pin 8) of the AND gate U7C to block passage of the 2 Hz bursts of 10 Hz flicker signal via the second input (pin 9) of AND gate U7C through to a second input (pin 8) of the first OR gate U4C.

The output of the OR gate U4C is connected to the first inputs (pins 1 and 6 respectively) of a pair of (fifth and sixth) AND gates U8A and U8B. The centre pole of turn signal switch S2 is connected to a source of +12 volts. The left pole of turn signal switch S2 is connected to the input of a second invertor U5B, and is also connected through a resistor R5 to ground, and is also connected to a second input (pin 2) of the fifth AND gate U8A. The right pole of turn signal switch S2 is connected to the input of a third invertor U5C, and is also connected through a resistor R4 to ground, and is also connected to a second input (pin 5) of the sixth AND gate U8B.

A four input AND gate U3A receives a signal on the first and second inputs (pins 2 and 3) from the output of the third AND gate U7D, a third input (pin 4) being connected to the output of the second invertor U5B, and a fourth input (pin 5) being connected to the output of the third invertor U5C.

The output of AND gate U3A is connected to the first inputs (pins 6 and 1 respectively) of a pair of OR gates U4B and U4A. A second input (pin 5) of OR gate U4B receives the signal output from the AND gate U8A, and a second input (pin 2) of OR gate U4A receives the signal output from the AND gate U8B.

The output of the OR gate U4B is connected to the signal input (pin 5) of a first augmented solid-state switch 17. (The LM1951T solid-state switch is not capable of switching a current of more than one ampere unless augmented as shown with the addition of a germanium transistor Q3, in which case the switching assembly is capable of switching a current of 25 amperes in response to logic high signal input supplied to pin 5 of the LM1951T switch. Switches 17, 19, and 21 are identically configured.) As the augmented solid-state switch 17 closes in response to a logic high voltage input at pin 5, and opens in response to a logic low voltage input at pin 5, the logic input signal (pin 5) effectively gates the +12 volt power output of augmented solid-state switch 17 for illuminating the left turn signal lamp LP1. The lamp LP1 in FIG. 2 actually represents the front and rear left turn indicator lights 3 and 7 as shown in FIG. 1, wired in parallel. The single signal light LP1 has been shown to simplify the diagram.

In a similar manner, the output of OR gate U4A is connected to the input (pin 5) of a second augmented solid-state switch 19, the +12 volt power output of which, in turn, is connected to the right turn signal lamp LP2 (which represents the right turn signal indicators 5 and 9 wired in parallel in FIG. 1).

Whenever the ignition switch S4 is closed (i.e. the motorcycle is in operation), oscillator U1 supplies a 2 Hz logic signal to the first input (pin 5) of AND gate U7B and to the first input (pin 2) of AND gate U7A, and oscillator U2 supplies a 10 Hz logic signal to the second input (pin 1) of AND gate U7A and to the first input (pin 12) of the AND gate U7D. Therefore, if ignition switch S4 is closed, AND gate U7A applies an output signal of a 10 Hz oscillation in a 2 Hz envelope to the second input (pin 9) of AND gate U7C.

When the horn switch S1 is open, invertor U5A generates a logic low voltage signal for application to the second input (pin 13) of AND gate U7D. Accordingly, whenever the horn switch S1 is open, AND gate U7D supplies a logic low voltage signal to the first and second inputs (pins 2 and 3) of AND gate U3A, so that the output of AND gate U3A generates a logic low voltage signal. Furthermore, when the turn signal switch S2 is open, logic low voltage signals are applied to the second inputs (pins 2 and 5 respectively) of AND gates U8A and U8B rendering their outputs at a logic low voltage. Therefore, when neither of the switches S1 or S2 is closed, neither of the lamps LP1 or LP2 is illuminated.

When horn switch S1 is open the 2 Hz output signal from AND gate U7B passes via the first input (pin 9) of OR gate U4C to the first inputs (pins 1 and 6 respectively) of AND gates U8A and U8B. Therefore, when turn signal switch S2 is closed to the left turn contact (as shown in FIG. 2, for example) while horn switch S1 is open, the second input (pin 2) of AND gate U8A will receive a logic high voltage signal from the +12 volt power source via the closed turn signal switch S2, and the 2 Hz signal output from AND gate U8A will pass via the second input (pin 5) of OR gate U4B to the augmented solid-state switch 17, which then delivers a 2 Hz power output signal to left turn signal LP1. Likewise, when turn signal switch S2 is closed to the right turn contact while horn switch S1 is open, the second input (pin 5) of AND gate U8B receives a logic high voltage signal from the +12 volt power source via the closed turn signal switch S2, and the 2 Hz signal output of AND gate U8B passes via the second input (pin 2) of OR gate U4A to the augmented solid-state switch 19, which delivers a 2 Hz power output signal to right turn signal LP2.

In the event that the horn switch S1 is closed without closing the turn signal switch S2, invertor U5A outputs a logic high voltage signal which is applied to the second input (pin 13) of AND gate U7D. Accordingly, the 10 Hz signal always present at the first input (pin 12) of AND gate U7D is gated through to the first and second inputs (pins 2 and 3) of AND gate U3A. In addition, when turn signal switch S2 is open, the second and third invertors U5B and U5C generate logic high voltage signals for application to the third and fourth inputs (pins 4 and 5) of AND gate U3A. Therefore, AND gate U3A transmits the input 10 Hz signal (received from AND gate U7D) through to the first inputs (pins 6 and 1 respectively) of OR gates U4B and U4A. The 10 Hz signal outputs from OR gates U4B and U4A activate augmented solid-state switches 17 and 19, thereby flashing both of the turn signal lamps LP1 and LP2 (actually all four turn indicators 3, 5, 7, and 9) at a frequency of 10 Hz simultaneously with the sounding of the horn.

When horn switch S1 is closed while the turn signal switch S2 is closed, invertor U5A outputs a logic high voltage signal which is applied to the first input (pin 8) of AND gate U7C. As the second input (pin 9) of AND gate U7C receives 2 Hz bursts of the 10 Hz signal from AND gate U7A, this signal passes via the second input (pin 8) of OR gate U4C to the first inputs (pins 1 and 6 respectively) of AND gates U8A and U8B. Therefore, when turn signal switch S2 is closed to the left turn contact (as shown in FIG. 2, for example) while horn switch S1 is closed, the second input (pin 2) of AND gate U8A will receive a logic high voltage signal from the +12 volt power source via the closed turn signal switch S2, and the 2 Hz bursts of 10 Hz signal output from AND gate U8A pass via the second input (pin 5) of OR gate U4B to the augmented solid-state switch 17, which delivers 2 Hz bursts of 10 Hz power output to left turn signal LP1. Likewise, when turn signal switch S2 is closed to the right turn contact while horn switch S1 is closed the second input (pin 5) of AND gate U8B receives a logic high voltage signal from the +12 volt power source via the closed turn signal switch S2, and the 2 Hz bursts of 10 Hz signal output from AND gate U8B pass via the second input (pin 2) of OR gate U4A to the augmented solid-state switch 19, which delivers 2 Hz bursts of 10 Hz power output to right turn signal LP2. Note that when both horn switch S1 and turn signal switch S2 are closed, the output of AND gate U3A will be at a logic low voltage, since the invertor on the side to which the turn is being signalled inputs a logic low voltage signal to AND gate U3A.

Turning briefly to FIG. 3, when the horn switch S1 is closed the 10 Hz signal output from AND gate U7D is also applied to a second input (pin 9) of a further AND gate U8C. When the intensity of the light level is above a fixed threshold (i.e. during daylight hours), the light activated switch Q1 applies a logic high level signal to the first input (pin 8) of AND gate U8C. In daytime therefore, if the horn button S1 is not pressed, input pin 9 receives a logic low voltage input and the AND gate U8A outputs a logic low signal which is inverted to a logic high voltage output by a third invertor U5D, which logic high voltage signal is applied to the input of solid state switch 21, which in response illuminates headlight/taillight LP3. Also in daytime, if the horn switch S1 is pressed, AND gate U8C passes the 10 Hz signal input (at pin 9) through to the input of invertor U5D which complements or inverts the 10 Hz signal before application to an augmented solid-state switch 21, which generates a 10 Hz power output signal corresponding to its 10 Hz signal input, which output is in turn applied to headlight/taillight LP3.

When the ambient light level falls below threshold (i.e. at night), the switch Q1 is disabled and a logic low signal is therefore applied to the first input of AND gate U8C. In this condition (night time), a logic signal to the second input of AND gate U8C does not affect the logic low output signal from AND gate U8C which is applied to an invertor U5D, which in turn applies a logic high output signal to pin 5 of augmented solid-state switch 21, which therefore supplies steady-state power to headlight/taillight LP3. Accordingly, the headlight only responds to the 10 Hz signal output from AND gate U8C during daylight hours, and remains in a steady-state ON condition at night without regard to the output of the horn switch S1.

In the event of a failure of the light activated switch Q1, or indeed of any hazard circuit components, switch S3 may be closed so that the headlight has an alternate source of steady-state power from battery BT1, via fuse F1 and ignition switch S4.

Figure 4:
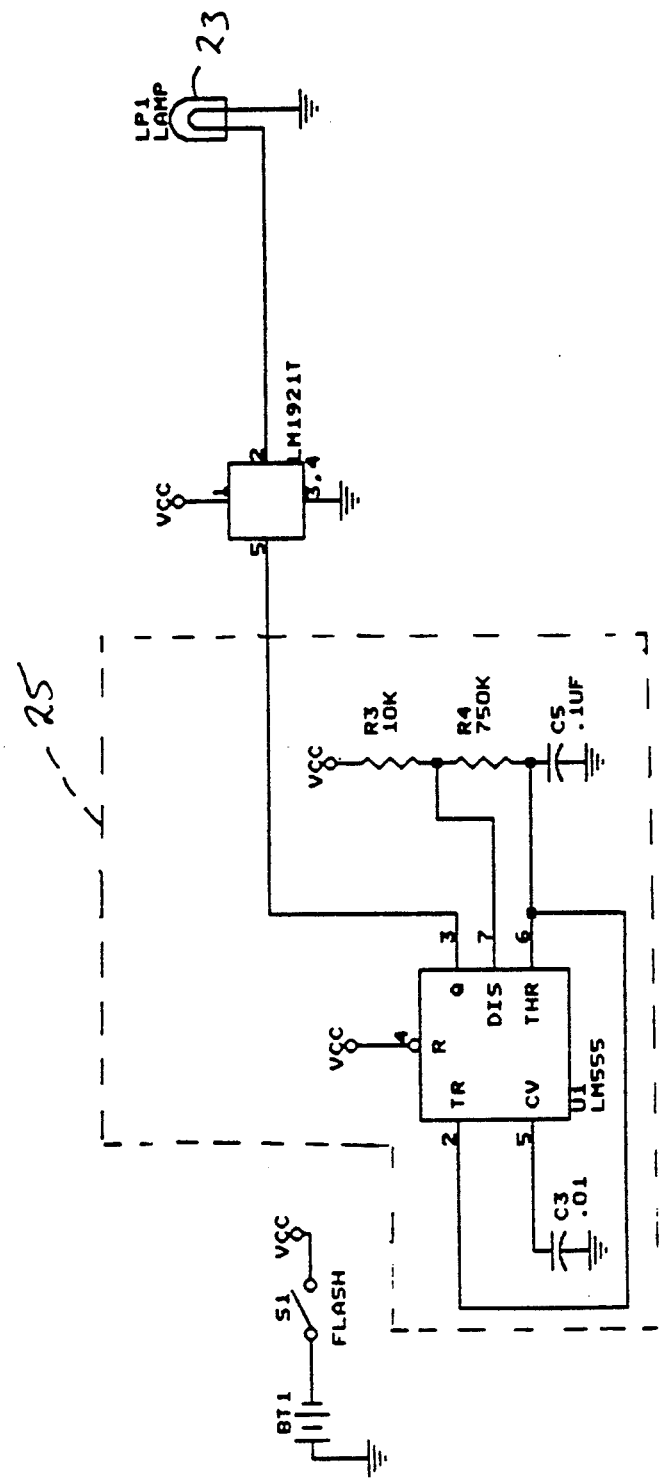
FIG. 4 is a schematic diagram of a bicycle emergency flasher circuit in accordance with an alternative embodiment of the invention.

Turning now to FIG. 4, an alternative embodiment of the invention is shown for use with a bicycle having a headlamp 23. Preferably, the headlamp 23 comprises a pair of lights connected in parallel (one at the rear and one at the front of the bicycle). The circuitry shown in stippled block 25 is identical to the timer circuitry discussed above with reference to FIG. 2. However, according to the embodiment of FIG. 4, power is applied to the circuitry of block 25 via a battery BT1 connected to the timer circuit (pin 4) via a flash switch S1. An output of the circuit 25 is connected to an input of a solid-state switch LM1921T which has an output connected to the lamp 23.

In operation, when flash switch S1 is open, no power is applied to the circuit 25 or to the solid-state switch LM1921T, and lamp 23 remains off. However, upon closing the flash switch S1, circuit 25 generates a 10 Hz signal which is applied to the input of solid-state switch LM1921T (which itself receives power from the battery BT1), thereby flashing the lamp 23 at a rate of approximately 10 Hz.

In summary, according to one aspect of the present invention, a motorcycle emergency flasher circuit is provided in which there are four user selectable modes of operation, namely the null mode when neither the horn switch nor the turn indicator switch is closed, an appropriate signal light flicker of approximately 2 Hz when the turn signal is selected without the horn switch being closed, a signal light flicker at 10 Hz when the horn activation switch is closed, and 2 Hz bursts of 10 Hz signal light flicker when the horn activation switch is closed along with one of the turn indicator switches. Furthermore, during daylight hours the selection of one of the latter two modes also causes the headlight and taillight to flicker at a frequency of 10 Hz.

As discussed above, the inventors have recognized the special significance of 10 Hz signalling flash in motorcycle (and bicycle) awareness signalling systems (i.e the human eye is maximally sensitive to light which is modulated in the vicinity of 10 Hz). Accordingly, it is contemplated that the principles of this invention may also be applied to automobiles or other motorized vehicles.

The motorcycle flasher circuit of the present invention performs all of the normal functions of a stock flasher assembly found under the side cover of a motorcycle (e.g. Honda 750). Therefore, the circuit of the present invention can easily be plugged into the socket normally utilized for receiving the stock assembly, and requires no additional space than that normally required for the assembly.

It is anticipated that a gate array logic circuit could be used to carry out the functions of the invertors and other logic circuits utilized in the preferred embodiment. Alternatively, a dedicated microchip can be designed to carry out these functions.

Other alternatives and variations are possible without departing from the sphere and scope of the invention as defined by the claims appended hereto.

We claim

1. An emergency flasher circuit for use with a motorized vehicle having a horn switch, and left and right turn indicator lights selectable by means of a turn indicator switch, said emergency flasher circuit comprising:
   a) means for generating a first signal having a frequency of 2 Hz and a second signal having a frequency of 10 Hz; and
   b) logic means connected to said horn switch, said turn signal switch and said means for generating, for operating said left and right turn indicator lights in accordance with the condition of said horn switch and said turn signal switch, wherein:
      i) in the event said horn switch is closed and neither of said turn indicator lights are selected then said second signal is applied to said left and right turn indicator lights for causing said lights to flash at said frequency of 10 Hz:
      ii) in the event said horn switch is open and one of said turn indicator lights is selected then said first signal is applied to said selected one of said left and right turn indicator lights for causing said selected one of said lights to flash at said frequency of 2 Hz;
      iii) in the event said horn switch is closed and one of said turn indicator lights is selected then said first signal and said second signal are combined and applied to said selected one of said left and right turn indicator lights for causing said selected one of said lights to flash at said frequency of 10 Hz within an 2 Hz envelope.

2. The emergency flasher of claim 1 wherein said means for generating comprises a first astable oscillator for generating said first signal at said frequency of 2 Hz, and a second astable oscillator for generating said second signal at said frequency of 10 Hz.

3. The emergency flasher of claim 2 wherein said logic means further comprises:
   c) a first invertor having an input and an output, said input being connected to a contact of said horn switch, an opposite pole of said horn switch being connected to ground;
   d) a second invertor having an input and an output, said input being connected to a first contact of said turn signal switch and to ground via a first resistor, an opposite pole of said turn signal switch being connected to a source of 12 V power;
   e) a third invertor having an input and an output, said input being connected to a second contact of said turn signal switch and to ground via a second resistor;
   f) a first AND gate having two inputs and an output, a first one of said inputs being connected to an output of said first astable oscillator and a second one of said inputs being connected to an output of said second astable oscillator;
   g) a second AND gate having two inputs and an output, a first one of said inputs being connected to the contact of said horn switch and a second one of said inputs being connected to the output of said first astable oscillator;
   h) a third AND gate having two inputs and an output, a first one of said inputs being connected to the output of said first AND gate and a second one of said inputs being connected to the output of said first invertor;
   i) a fourth AND gate having two inputs and an output, a first one of said inputs being connected to the output of said second astable oscillator and a second one of said inputs being connected to the output of said first invertor;
   j) a first OR gate having two inputs and an output, a first one of said inputs being connected to the output of said second AND gate and a second one of said inputs being connected to the output of said third AND gate;
   k) a fifth AND gate having two inputs and an output, a first one of said inputs being connected to the output of said first OR gate and a second one of said inputs being connected to the first contact of said turn indicator switch and to ground via said first resistor;
   l) a sixth AND gate having two inputs and an output, a first one of said inputs being connected to the output of said first OR gate a second one of said inputs being connected to the second contact of said turn indicator switch and to ground via said second resistor;
   m) a seventh AND gate having four inputs and an output, first and second ones of said inputs being connected to the output of said fourth AND gate, a third one of said inputs being connected to the output of said second invertor and a fourth one of said inputs being connected to the output of said third invertor;
   n) a second OR gate having two inputs and an output, a first one of said inputs being connected to the output of said fifth AND gate and a second one of said inputs being connected to the output of said seventh AND gate;
   o) a third OR gate having two inputs and an output, a first one of said inputs being connected to the output of said sixth AND gate and a second one of said inputs being connected to the output of said seventh AND gate;

p) a first augmented solid-state switch having a power input connected to said source of 12 V power, a control input connected to the output of said second OR gate, and an output connected to the right turn indicator light; and q) a second augmented solid-state switch having a power input connected to said source of 12 V power, a control input connected to the output of said third OR gate, and an output connected to the left turn indicator light.

4. An emergency flasher circuit for use with a motorized vehicle having a horn switch and at least one headlight, said emergency flasher circuit comprising:

a) means for generating a signal having a frequency of 10 Hz;

b) means for detecting an ambient light level greater than a predetermined amount; and c) logic means connected to said horn switch, said headlight, said means for generating, and said means for detecting, for causing said headlight to flash at said frequency of 10 Hz in the event that said horn switch is closed and said means for detecting said ambient light level greater than said predetermined amount.

5. The emergency flasher circuit of claim 4, wherein said means for generating comprises an astable oscillator for generating said signal at said frequency of 10 Hz.

6. The emergency flasher circuit of claim 4, wherein said logic means further comprises:

d) a first invertor having an input and an output, said input being connected to a contact of said horn switch, an opposite pole of said horn switch being connected to ground;

e) a first AND gate having two inputs and an output, a first one of said inputs being connected to the output of said astable oscillator and second one of said inputs being connected to the output of said first invertor;

f) a light activated switch for generating a logic high signal in response to being exposed to light levels of greater than said predetermined amount;

g) a second AND gate having a pair of inputs and an output, a first input thereof connected to said light activated switch, and a second input thereof connected to the output of said first AND gate;

h) a second inverter having an input and an output, said input being connected to the output of said second AND gate;

i) a source of DC power; and j) a first augmented solid-state switch having a power input connected to said source of DC power, a control input connected to the output of said second invertor, and an output connected to said headlight.

* * * * *

UNITED STATES PATENT AND TRADEMARK OFFICE
CERTIFICATE OF CORRECTION

PATENT NO. : 5,264,826
DATED : November 23, 1993
INVENTOR(S) : HENDERSON, et al.

It is certified that error appears in the above-identified patent and that said Letters Patent is hereby corrected as shown below:

Col. 1, line 58, change "ar" to --art--.

Col. 9, line 30, (claim 4), after "tecting", insert --detects--.

Signed and Sealed this

Twentieth Day of September, 1994

Attest:

BRUCE LEHMAN

Attesting Officer   Commissioner of Patents and Trademarks